Dec. 12, 1933.   W. H. VIBBER   1,939,191
CONNECTING FITTING FOR ELECTRICAL SYSTEMS
Filed March 19, 1929
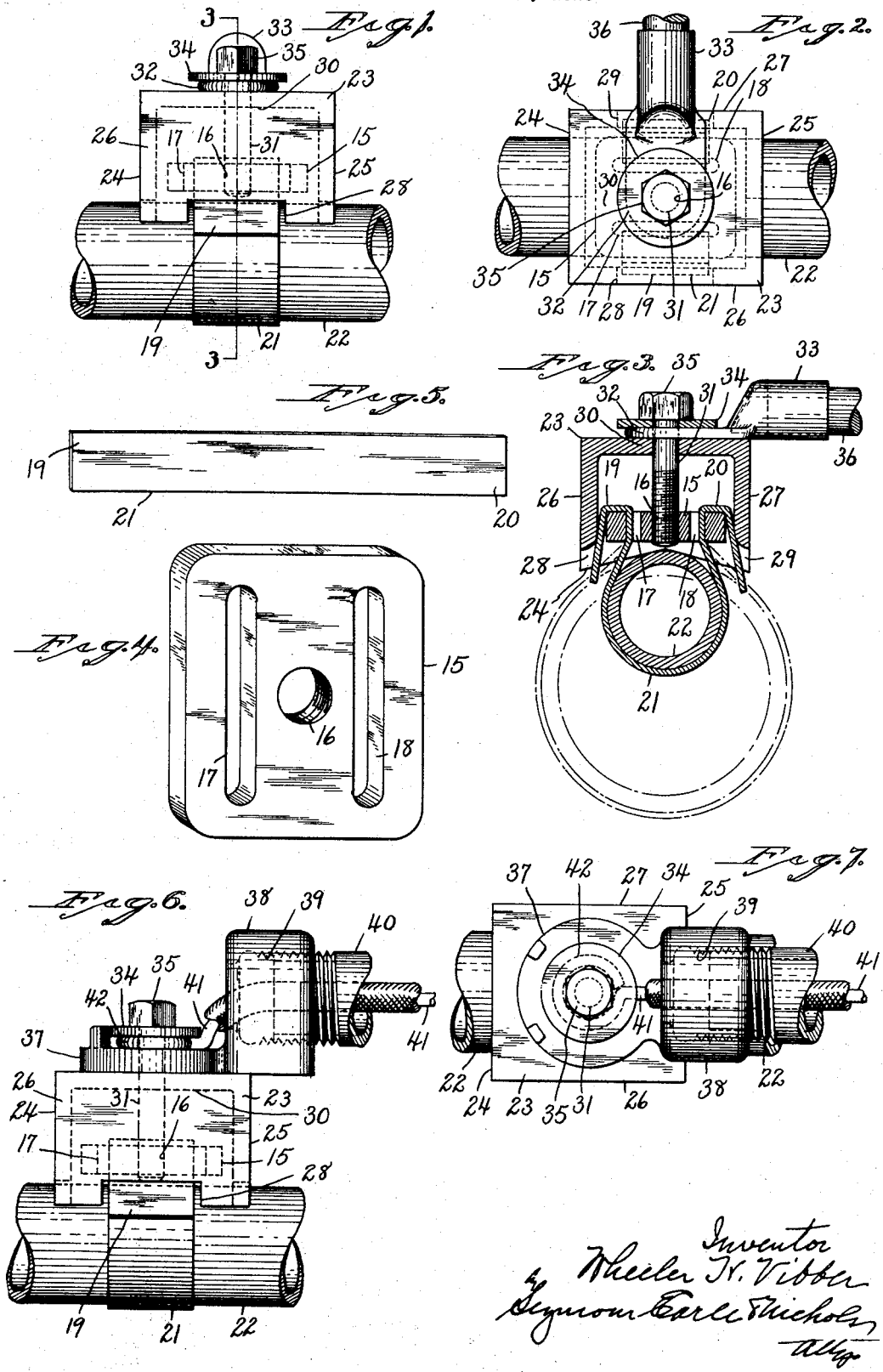
Inventor
Wheeler N. Vibber
Seymour Earle Nichols Patented Dec. 12, 1933

1,939,191

UNITED STATES PATENT OFFICE 1,939,191

CONNECTING-FITTING FOR ELECTRICAL SYSTEMS

Wheeler H. Vibber, New London, Conn.

Application March 19, 1929. Serial No. 348,220

1 Claim. (Cl. 173—273)

This invention relates to an improvement in connecting-fittings for electrical systems and particularly to grounding-fittings, though not so limited, and has for its object the provision of a simple, reliable and efficient fitting of the class described constructed with particular reference to its adaptability to be readily secured to pipes or similar objects of varying diameters.

With the above object in view my invention consists in a connecting-fitting for electrical systems characterized by a draft-member provided with means for engaging a pipe-strap; a pipe-strap adapted to substantially encircle a pipe and having its ends engaged with the said draft-member; a bridge-member extending over said draft-member; and screw-means extending between the said draft-member and bridge-member for drawing the former outward and the latter inward; whereby the fitting may be firmly secured to the said pipe and electrically connected therewith.

My invention further consists in a connecting-fitting characterized as above and having certain other details of construction and combinations of parts as will be hereinafter described and particularly recited in the claim.

In the accompanying drawing:

Fig. 1 is a view in side elevation of one form which a grounding-fitting embodying my invention may assume, the said fitting being shown as applied to a pipe;

Fig. 2 is a top or plan view thereof;

Fig. 3 is a transverse sectional view taken on the line 3—3 of Fig. 1;

Fig. 4 is a detached perspective view of the double-slotted draft-plate;

Fig. 5 is a detached perspective view of the pipe-strap before the same is bent around the pipe;

Fig. 6 is a view in side elevation corresponding to Fig. 1 but showing a conduit terminal-head secured to the grounding-fitting;

Fig. 7 is a top or plan view thereof.

In carrying out my invention as shown in Figs. 1 to 7 inclusive I employ a draft-plate 15 of substantially rectangular form and provided centrally with a threaded bore 16 and on either side of the said bore with complementary strap-receiving slots 17 and 18. The ends 19 and 20 respectively of a pipe-strap 21 which encircles a pipe 22, are passed upward respectively through the slots 17 and 18 of the draft-plate 15 and are bent outward and downward over the side-edges thereof, as shown in Fig. 3 of the drawing.

The bending of the ends of the pipe-strap 21 as above described serves to couple them to the draft-plate 15 for the purpose as will hereinafter appear.

Setting over the draft-plate 15 and over the ends 19 and 20 of the pipe-strap 21 is an inverted cup-shaped bridge-member 23, the edges of the end-walls 24 and 25 of which bear upon the periphery of the pipe 22 opposite the main-reach of the pipe-strap 21.

The side-walls 26 and 27 of the said bridge-member are respectively formed with notches 28 and 29 arranged in line with the ends of the said pipe-strap and receiving the ends 19 and 20 thereof to maintain the same in their bent position and to provide clearance for the said pipe-strap ends when the fitting is applied to a pipe of large diameter, as indicated by broken lines in Fig. 3 of the drawing.

Passing inward through the body 30 of the inverted cup-shaped bridge-member 23 is a bolt 31 having its threaded inner end engaged with the threads of the bore 16 in the draft-plate 15 before described. As shown in Figs. 1 to 3 inclusive the perforated lip 32 of a so-called soldering-lug 33 has the bolt 31 passed through it.

A washer 34 is interposed between the outer face of the lip 32 of the soldering-lug and the underface of the head 35 of the bolt 31. The soldering-lug 33 has a conductor 36 leading to the electrical system, which it is desired to ground, soldered into it.

In installations where it is desired to mechanically shield the grounding-wire, I omit the soldering-lug 33 shown in Figs. 1 to 3 inclusive, and pass the bolt 31 through the lip 37 of a conduit terminal-head 38 which is provided with a threaded bore 39 for the reception of the threaded end of a conduit-pipe 40, as shown in Figs. 6 and 7 of the drawing.

A grounding-wire 41 passing through the conduit 40 and leading to the electrical system which it is desired to ground has its outer end wrapped as at 42 around the bolt 31 and pinched between the washer 34 on the said bolt and the upper face of the lip 37 of the conduit terminal-head 38.

By screwing the bolt 31 into the threaded bore 16 of the draft-plate 15, the latter is drawn outward to firmly engage the strap 21 with the periphery of the pipe 22 and the bridge-piece 23 is forced inward so that the edges of its end-walls 24 and 25 are firmly engaged with the periphery of the pipe 22 at points substantially opposite the main reach of the pipe-strap 21.

This turning in of the screw 31 as just described also serves to clamp either the soldering-lug 33 or the end 42 of the wire 41 firmly in place, so that an electrical path of low resistance is provided between the pipe 22 and the electrical system to which either of the ground-wires 36 or 41 extend.

It is obvious without further illustration that in situations requiring large-capacity ground-connections, a number of my improved grounding-fittings may be applied to a pipe-system and electrically inter-connected in multiple by busbars or wires.

I claim:

A connecting-fitting including a draft-member provided with two complementary slots for receiving the respective opposite ends of a pipe-strap; a flexible pipe-strap adapted to substantially encircle a pipe or the like and having its respective opposite ends passed through the slots in the said draft-member and folded over the upper surface of the latter; a substantially-rectangular cup-shaped bridge-member extending over and housing the said draft-member and having its complementary end-walls engaged with the periphery of the pipe adjacent the respective opposite side edges of the said strap and having its complementary side-walls each notched to provide a clearance passage for the respective opposite ends of the said strap; a socket-member applied to the outer face of the said bridge-member and provided with a laterally-extending socket; and screw-means extending between the said socket-member and the said draft-member and passing through the said bridge-member to simultaneously engage the said socket-member with the said bridge-member, draw outwardly upon the said draft-member to draw the said strap taut about a pipe or the like, and engage the end-walls of the said cup-shaped bridge-member with the periphery of the said pipe on the respective opposite sides of the said strap; whereby upon the tightening of the said screw-means the said draft-member may move within the said bridge-member and the respective opposite ends of the said strap-member may move upwardly into the interior of the latter through the clearance openings, before referred to, in the side-walls thereof.

WHEELER H. VIBBER.